United States Patent [19]
Ito et al.

[11] Patent Number: 6,097,589
[45] Date of Patent: Aug. 1, 2000

[54] SHUTTER MECHANISM FOR ELECTRODE PAD ATTACHED CARD AND CONTACT

[75] Inventors: Toshiyasu Ito, Togane; Shigeru Sato, Yotsukaido, both of Japan

[73] Assignee: Yamaichi Electronics Co., Ltd., Tokyo, Japan

[21] Appl. No.: 08/844,900

[22] Filed: Apr. 22, 1997

[30]     Foreign Application Priority Data

Apr. 23, 1996  [JP]  Japan .................................... 8-101351

[51] Int. Cl.$^7$ ...................................................... H02B 1/00
[52] U.S. Cl. ........................... 361/600; 361/787; 439/140
[58] Field of Search ................................... 235/492, 441; 361/617, 733, 737, 740–741, 752–753, 785, 787, 791; 439/140–141, 267, 630

[56]           References Cited

U.S. PATENT DOCUMENTS

| | | | |
|---|---|---|---|
| 4,695,925 | 9/1987 | Kodai et al. .............................. | 439/140 |
| 4,767,348 | 8/1988 | Murakami ................................ | 439/140 |
| 4,924,079 | 5/1990 | Banjo et al. .............................. | 439/140 |
| 4,933,540 | 6/1990 | Omori et al. ............................. | 235/492 |
| 5,047,894 | 9/1991 | Onoda et al. ............................ | 439/140 |

FOREIGN PATENT DOCUMENTS

| | | | |
|---|---|---|---|
| 2241390 | 8/1991 | United Kingdom ................... | 439/141 |

*Primary Examiner*—Gregory Thompson
*Attorney, Agent, or Firm*—Wenderoth, Lind & Ponack, L.L.P.

[57]           ABSTRACT

A shutter mechanism for an electrode pad attached card and a contact comprises a slider which can reciprocally move forwardly and backwardly in accordance with insertion and withdrawal of an electrode pad attached card. A contact guide groove is formed in the slider in such a manner as to extend in a direction of the reciprocal movement of the slider and adapted to guide a contacting projection of a contact. A release groove is formed in a bottom surface of the contact guide groove, the release groove having a smaller width than that of the guide groove and extending in the direction of the reciprocal movement of the slider. The release groove is in opposing relation with the contacting projection, a slip portion formed at an area in the vicinity of the contacting projection, the slip portion being resiliently contacted with a stepped portion formed along an opening edge of the release groove. The slider is reciprocally moved with the slip portion resiliently contacting the stepped portion and canceling the resilient contact relation with the stepped portion at an end of the forward movement of the slider so that the contacting projection is resiliently contacted with the card electrode pad.

4 Claims, 6 Drawing Sheets

SHUTTER MECHANISM FOR ELECTRODE PAD ATTACHED CARD AND CONTACT

BACKGROUND OF THE INVENTION

Field of the Invention

This invention relates to a shutter mechanism for an electrode pad attached card, and a contact in which a contacting relation and a contact released relation between an electrode pad attached card having an IC, etc., and a contact are controlled by a slider which is reciprocally moved forwardly and backwardly in accordance with insertion and withdrawal of the card.

As shown in FIGS. 7A–7B, a typical prior art arrangement is designed such that an electrode pad attached card (memory card) containing therein an IC is inserted into a receiving slit of an electronic instrument such as a personal computer, word processor or the like, and the contact 4 is contacted with the electrode pad 3 provided on an upper surface of the card, so that the IC contained in the card is electrically connected to a data processing circuit within the electronic instrument in order to give data contained in the IC of the card to the data processing circuit within the electronic instrument or record the data contained in the data processing circuit within the electronic instrument on the card.

As means for controlling a contacting relation and a contact released relation between the electrode pad 3 of the card and the contact 4, the conventional arrangement includes a slider 5 which can reciprocally move forwardly and backwardly in accordance with insertion and withdrawal of the card. The slider is formed with a contact guide groove 10 having a bottom, extending in a direction of the reciprocal movement of the slider 5 and adapted to guide the contacting projection 7 of the contact. During the reciprocal movement of the slider 5, the contacting projection 7 of the contact 4 is in resilient contact with a bottom surface of the contact guide groove 10, so that a contact released relation with the card is established. At the end of the forward movement of the slider 5, the contacting projection 7 is resiliently restored to project through a through-hole 13 formed in one end portion of the guide groove 10, so that the contacting projection 7 is contacted under pressure with the electrode pad 3 of the card.

The slider is helpful in reducing sliding movement, under pressure, of the contacting projection of the contact with respect to the surface of the card surface or electrode pad surface as much as possible. Owing to this arrangement, damage to the electrode pad or the IC contained in the card due to repeated insertion and withdrawal of the card can effectively be prevented.

However, in the above-mentioned conventional shutter mechanism for a contact, since the contacting projection of the contact is resiliently contacted with the guide groove bottom surface of the slider and the slider is repeatedly reciprocally moved forwardly and backwardly in that resiliently contacted condition, a plating applied to the contacting projection is liable to wear quickly and as a result, reliability of the contacting relationship between the electrode pad 3 and the contact 4 is degraded.

The present invention has been accomplished in view of the above problems.

SUMMARY OF THE INVENTION

It is, therefore, a general object of the present invention to provide a shutter mechanism for an electrode pad attached card and a contact in which the problems inherent in the prior art device can appropriately be obviated.

In order to achieve the above object, according to one aspect of the present invention, there is essentially provided a shutter mechanism for an electrode pad attached card and a contact comprising a slider which can reciprocally move forwardly and backwardly in accordance with insertion and withdrawal of an electrode pad attached card; a contact guide groove formed in the slider in such a manner as to extend in a direction of the reciprocal movement of the slider and adapted to guide a contacting projection of a contact; a release groove formed in a bottom surface of the contact guide groove, the release groove having a smaller width than that of the guide groove and extending in the direction of the reciprocal movement of the slider, the release groove being in opposing relation with the contacting projection; a slip portion formed at an area in the vicinity of the contacting projection, the slip portion being resiliently contacted with a stepped portion formed along an opening edge of the release groove; the slider being reciprocally moved with the slip portion resiliently contacting the stepped portion and canceling the resilient contact relation with the stepped portion at an end of the forward movement of the slider so that the contacting projection is resiliently contacted with the card electrode pad.

It is preferred that the contacting projection is loosely fitted into the release groove while the slip portion is in resilient contact with the stepped portion.

It is also preferred that the slip portion is disposed on each opposite side of the contacting projection.

According to another aspect of the present invention, there is also provided a shutter mechanism for an electrode pad attached card and a contact comprising a slider which can reciprocally move forwardly and backwardly in accordance with insertion and withdrawal of an electrode pad attached card; a contact guide groove formed in the slider in such a manner as to extend in a direction of the reciprocal movement of the slider and adapted to guide a contacting projection of a contact; and a slip portion projecting from an area adjacent to a rear part of the contacting projection of the contact, the slip portion being resiliently contacted with a bottom surface of the contact guide groove, thereby creating a floating state of the contacting projection from the contact guide groove bottom surface; the slider being reciprocally moved with the slip portion resiliently contacting the contact guide groove bottom surface and canceling the resilient contact relation with the contact guide groove bottom surface at an end of the forward movement of the slider so that the contacting projection is resiliently contacted with the card electrode pad.

The above and other objects, characteristic features and advantages of the present invention will become more apparent to those skilled in the art by the following description of the preferred embodiments of the invention, as illustrated in the accompanying drawings.

BRIEF DESCRIPTION OF THE DRAWINGS

FIG. 1A is a sectional view of a shutter mechanism for an electrode pad attached card and a contact which is in its contact released position, FIG. 1B is likewise a sectional view of the shutter mechanism for an electrode pad attached card and the contact in its contacting position, FIG. 1C is likewise a sectional view of the shutter mechanism for an electrode pad attached card and the contact taken on line $C_1$–$C_1$ of FIG. 1A, and FIG. 1D is a plan view of the contact used in the shutter mechanism for an electrode pad attached card and the contact;

FIG. 2A is a sectional view of a shutter mechanism for an electrode pad attached card and a contact which is in its contact released position, FIG. 2B is likewise a sectional view of the shutter mechanism for the electrode pad attached card and the contact in its contacting position, FIG. 2C is likewise a sectional view of the shutter mechanism for the electrode pad attached card and the contact taken on line $C_2$–$C_2$ of FIG. 2A, and FIG. 2D is a plan view of the contact used in the shutter mechanism for the electrode pad attached card and the contact;

FIG. 3A is a sectional view of a shutter mechanism for an electrode pad attached card and a contact which is in its contact released position, FIG. 3B is likewise a sectional view of the shutter mechanism for the electrode pad attached card and the contact in its contacting position, FIG. 3C is likewise a sectional view of the shutter mechanism for the electrode pad attached card and the contact taken on line $C_3$–$C_3$ of FIG. 3A, FIG. 3D is a plan view of the contact used in the shutter mechanism for the electrode pad attached card and the contact, and FIG. 3D' is a plan view of a main portion showing another example of a structure of a sliding portion;

FIG. 4A is a sectional view of a shutter mechanism for an electrode pad attached card and a contact which is in its contact released position.

FIG. 5A is a sectional view of a shutter mechanism for an electrode pad attached card and a contact which is in its contact released position, FIG. 5B is likewise a sectional view of the shutter mechanism for the electrode pad attached card and the contact in its contacting position, and FIG. 5C is likewise a sectional view of the shutter mechanism for the electrode pad attached card and the contact taken on line $C_4$–$C_4$ of FIG. 5A;

DETAILED DESCRIPTION OF THE EMBODIMENTS

Several embodiments of a shutter mechanism for an electrode pad attached card and a contact according to the present invention will now be described in detail with reference to the accompanying drawings which constitute a part of this specification.

Figure 1:
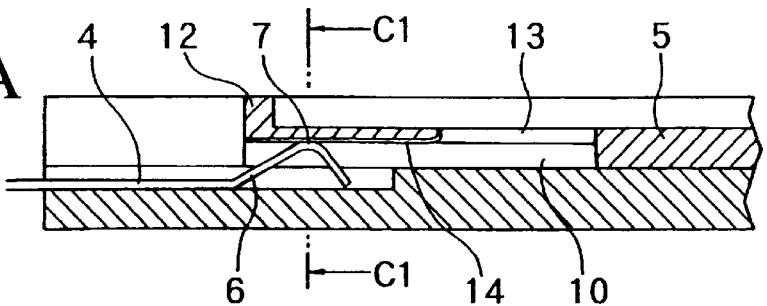
FIGS. 1A–D illustrate a first embodiment of the present invention.
Figure 1:
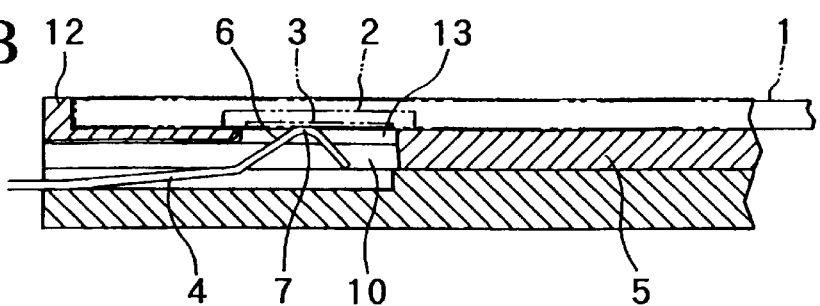
Figure 1:
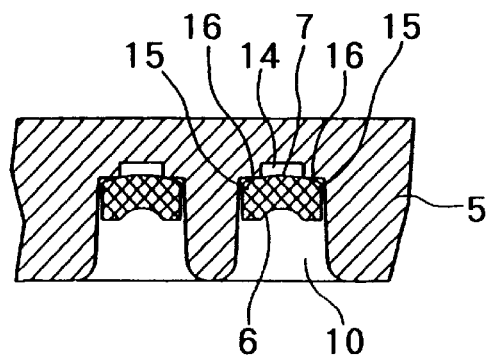
Figure 1:
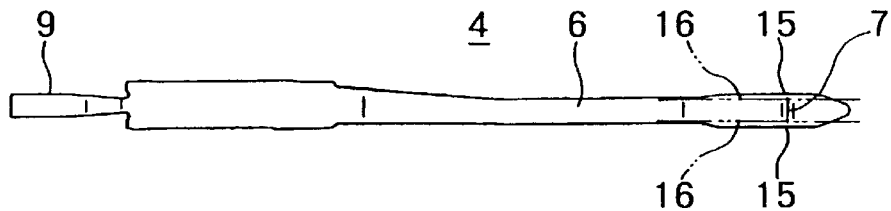
Figure 2:
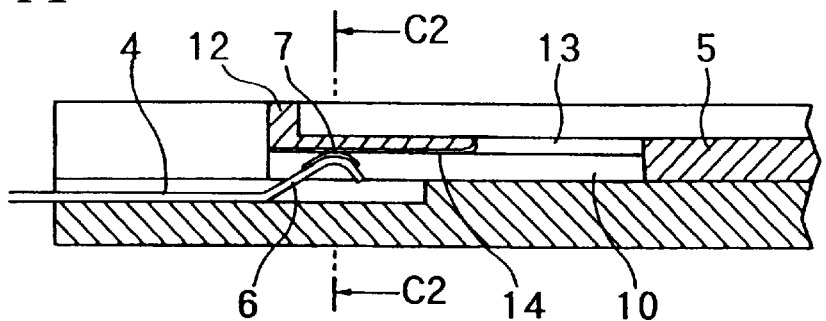
FIGS. 2A–D illustrate a second embodiment of the present invention.
Figure 2:
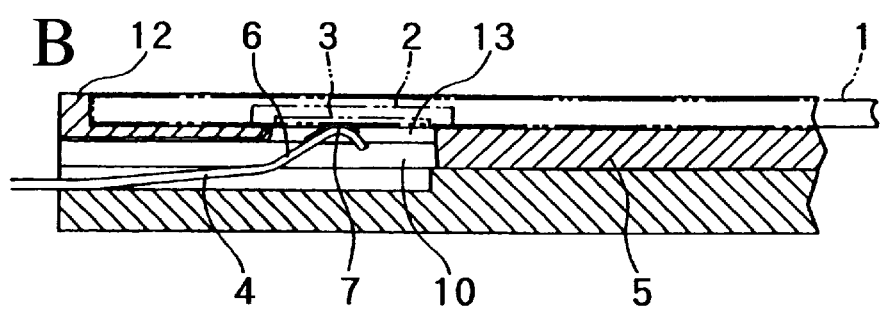
Figure 2:
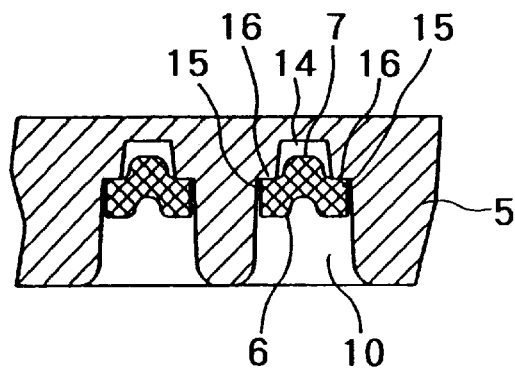
Figure 2:
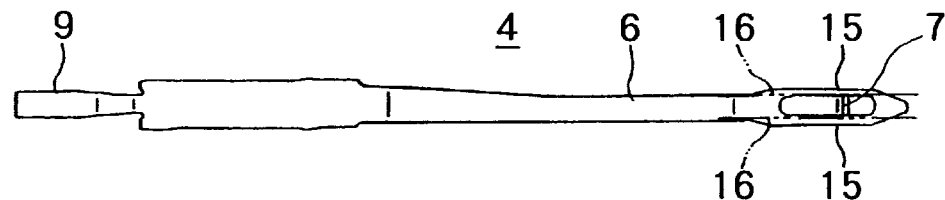
Figure 3:
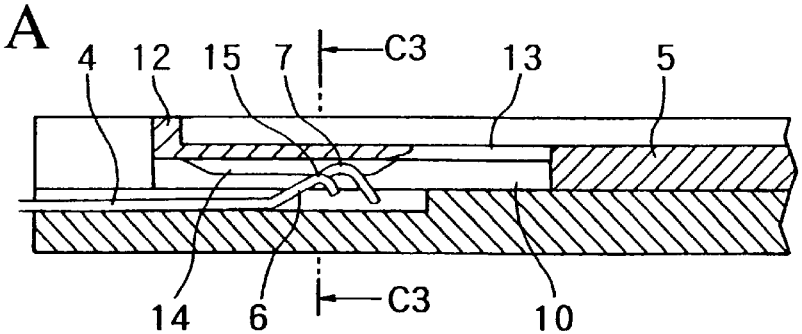
FIGS. 3A–D illustrate a third embodiment of the present invention.
Figure 3:
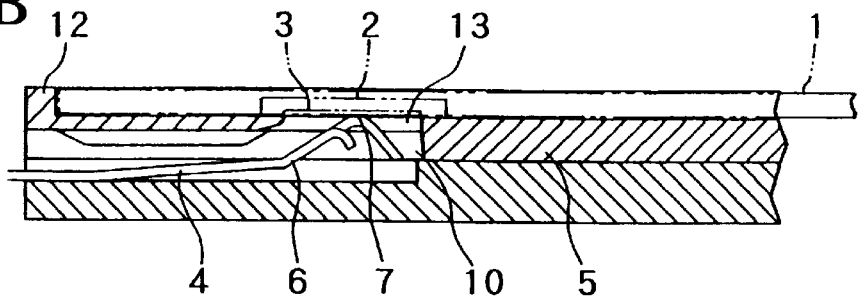
Figure 3:
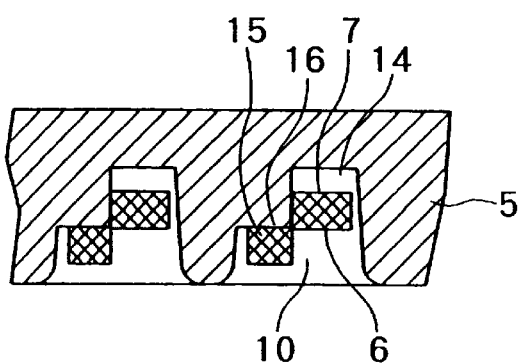
Figure 3:
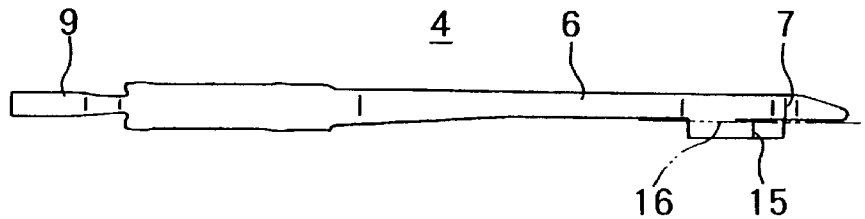
Figure 3:
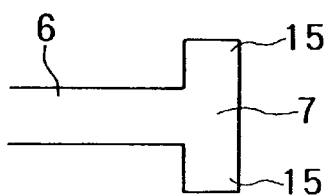
Figure 4:
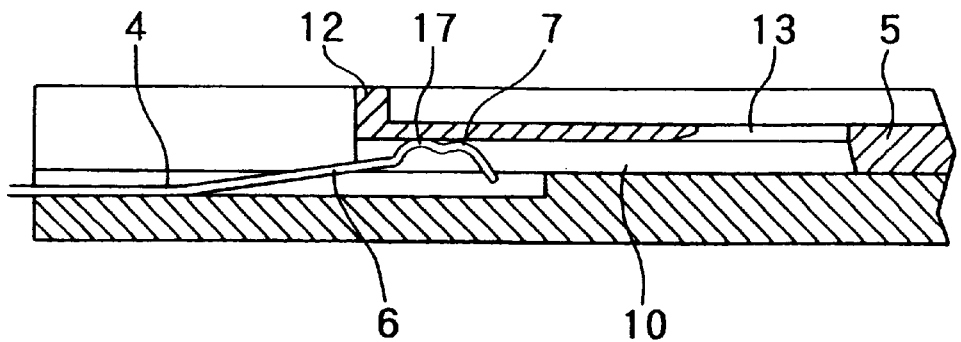
FIGS. 4A and B illustrate the fourth embodiment of the present invention.
FIG. 4B is likewise a sectional view of a shutter mechanism for the electrode pad attached card and the contact in its contacting position.
Figure 4:
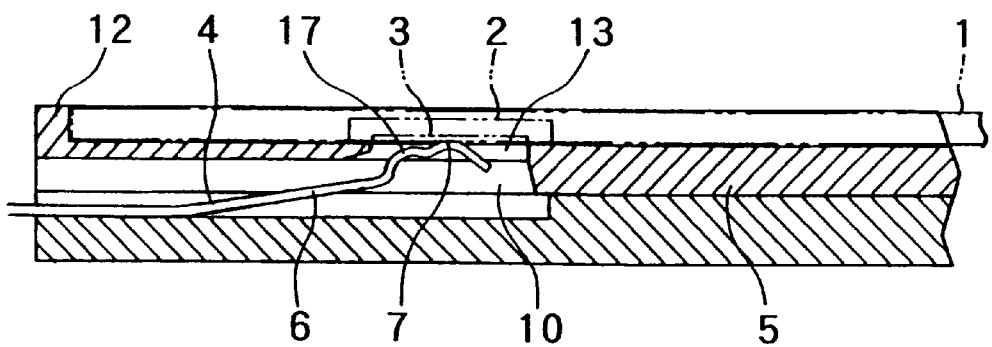
Figure 5:
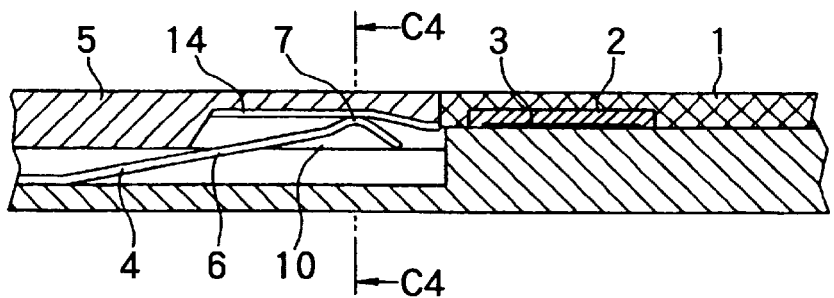
FIGS. 5A–D illustrate the first embodiment of the present invention.
Figure 5:
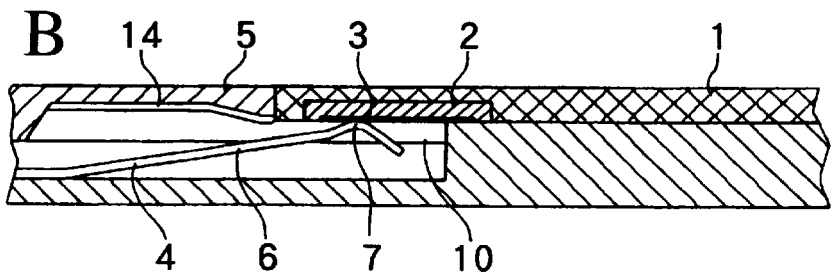
Figure 5:
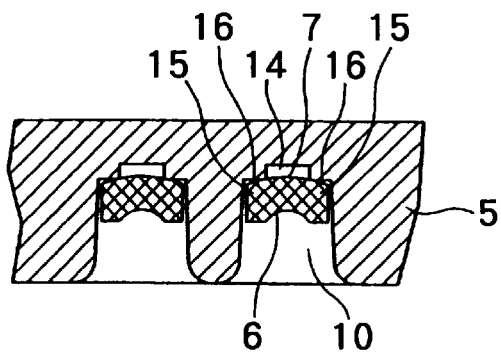
Figure 6:
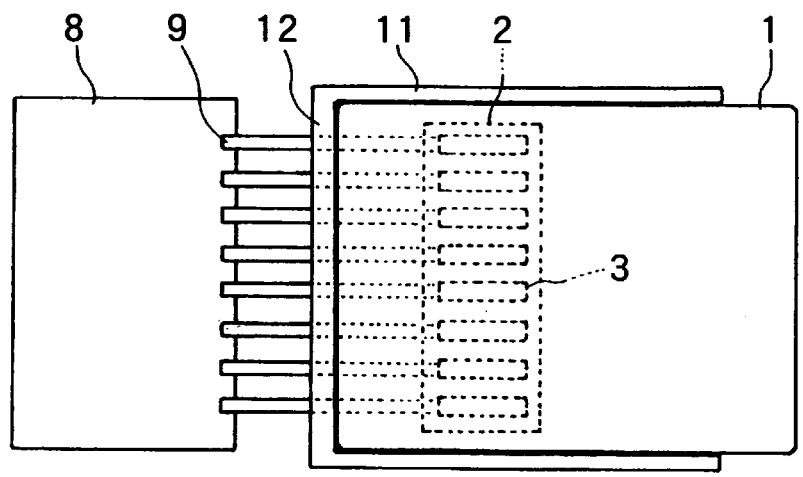
FIG. 6 is a plan view of the shutter mechanism for the electrode pad attached card and the contact of FIGS. 1 through 4.
Figure 7:
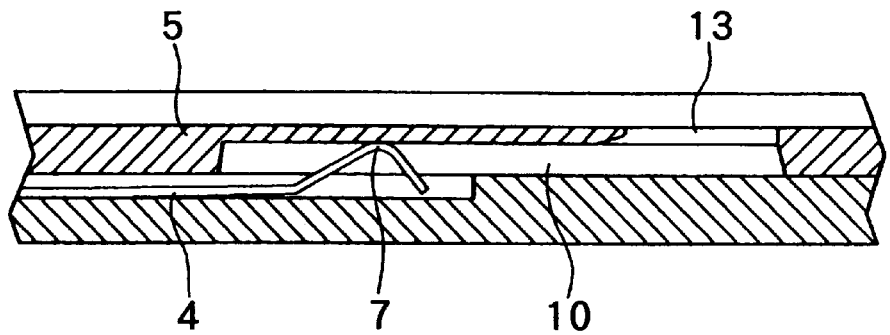
FIG. 7A is a sectional view of a conventional shutter mechanism for an electrode pad attached card and a contact which is in its contact released position.
FIG. 7B is likewise a shutter mechanism for the electrode pad attached card and the contact which is in its contacting position.
Figure 7:
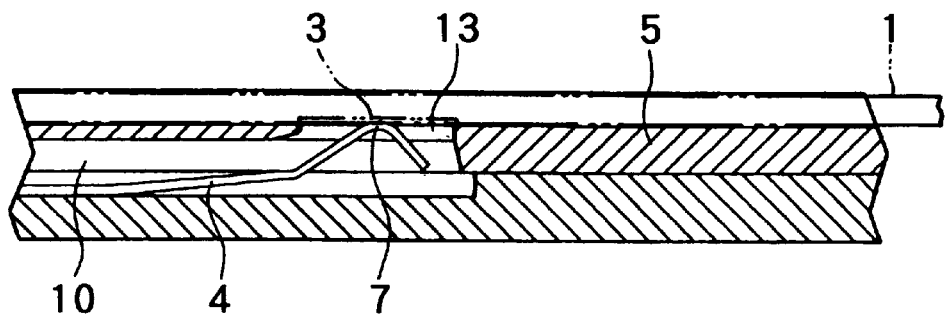

In FIGS. 1A through 5C, reference numeral 1 denotes a flat card having a generally rectangular shape as shown in FIG. 6. The card 1 includes an IC 2 as a memory element and a plurality of electrode pads 3 arranged in an array on its upper surface. Also, the card 1 maybe a card including a circuit shutter mechanism, but not having the above IC 2 and having only the electrode pads 3.

Reference numeral 4 denotes contacts which are arranged in such a manner as to correspond to the electrode pads 3 of the card 1, and reference numeral 5 denotes a slider which is capable of reciprocally moving forwardly and backwardly in accordance with an insertion and a withdrawal motion of the card 1 and adapted to control a realization of a contacting position and a contact released position between each electrode pad 3 and each contact 4.

The contacts 4 are composed of a conductive elongated piece formed by blanking a metal plate and bending the same. One end of each contact 4 is provided with an elongated resilient piece 6. The elongated resilient piece 6 is provided at its free end with a contacting projection 7 for resiliently contacting a corresponding electrode pad 3. The other end of each contact 4 is provided with a terminal element 9 connected, by soldering or the like, to a wiring circuit board 8 which constitutes a part or a whole of a data processing circuit. Each contact 4 is elongated in a direction of a reciprocal movement of the slider 5. A plurality of such contacts 4 are arranged in an array in a direction perpendicular to the reciprocal movement of the slider 5.

On the other hand, the slider 5 includes a plurality of contact guide grooves 10 on its surface opposing the contacts 4. The contact guide grooves 10 are elongated in a direction of a reciprocal movement the slider 5 and arranged in an array in a direction perpendicular to the reciprocal movement direction. The slider 5 is reciprocally moved with the contacting projections 7 received in the contact guide grooves 10 respectively so that they are correctly positioned. The contacting projections 7 are released generally at the end of the reciprocal movement so that they are resiliently contacted with the corresponding electrode pads 3.

In the examples illustrated in FIGS. 1A through 4B, the slider 5 is also used as a card tray for receiving therein such that the card 1 is correctly positioned. In contrast, FIGS. 5A–C show an example of a slider 5 having only a shutter function for the contacts 4 and the electrode pads 3.

The slider 5 of FIGS. 1A through 4B includes a side ruler 11 for restricting a side edge of the card 1 and a front abutment 12 against which a front edge of the card 1 can be abutted, as best shown in FIG. 6. The card 1 is inserted into a space defined by the side ruler 11 and the front abutment 12 with the front edge of the card 1 being in abutment with the front abutment 12. Owing to this arrangement, the slider moves in one direction (forwardly) in accordance with insertion of the card 1 and in the other direction (backwardly) in accordance with withdrawal of the card 1. During the reciprocal movement of the slider 5 in accordance with the insertion and withdrawal of the card 1, the contacting projections 7 are in a contact released position relative to the electrode pads 3 within the contact guide grooves 10. Only when the slider 5 comes to the end of the forward movement, the contacting projections 7 are in the contacting position relative to the electrode pads 3 as previously mentioned.

On the other hand, the example shown in FIG. 5A–C is designed such that the front end of the card 1 is brought into abutment with a rear end face of the slider 5. Owing to this arrangement, the slider 5 is reciprocally moved in accordance with insertion and removal of the card 1, thereby establishing the previously mentioned contacting and contact released relationship.

The backward movement of the slider 5 is caused by spring means or an injection mechanism, not shown. As previously mentioned, in accordance with this backward movement of the slider 5, the card 1 is withdrawn and the contact released relationship is established.

In FIGS. 1A through 4B, the slider 5 is provided at an area of each contact guide groove 10 corresponding to the end of the forward movement of the slider 5 with a through-hole 13 extending all the way through the slider 5 and reaching the space for receiving the card 1 defined at the other surface of the slider 5. Owing to this arrangement, the contacting projection 7 is released at the through-hole 13 at the end of the forward movement of the slider 5, so that the contacting projection 7 is allowed to resiliently contact the corresponding electrode pad 3 of the card 1 by a restoring force of the contacting projection 7.

The slider 5 illustrated in FIGS. 5A–C is provided with no such throughholes as previously mentioned, and the contacting projection 7 is resiliently contacted with the electrode pad 3 of the card 1 which is in abutment with the rear end face of the slider which has escaped from the end portion of the guide groove 10 at the end of the forward movement of the slider 5.

In the examples of FIGS. 1A through 4B, there is a provision of the slider 5 capable of a reciprocal movement in accordance with insertion and withdrawal of the electrode pad attached card 1, and the slider 5 is formed with contact guide grooves 10 each having a bottom extending in a direction of the reciprocal movement of the slider 5 and adapted to guide the contacting projections 7 of the contacts 4. Each of the contact guide grooves 10 is provided at a bottom surface thereof with a release groove 14 extending in the direction of the reciprocal movement of the slider 5 and having a smaller width than that of each guide groove 10.

The release grooves 14 are in opposing relationship with the contacting projections 7, respectively. Each contacting projection 7 is provided at its nearby area with a slip portion 15 which is resiliently contacted with a step portion 16 which composes the bottom surface of the guide groove formed along an opening edge of the release groove 14. The slider 5 is reciprocally moved with the slip portion 15 resiliently contacting the step portion 16. At the end of the forward movement of the slider 5, the resilient contact relationship of the slip portion 15 with the step portion 16 is canceled to allow the contacting projection 7 to resiliently contact the corresponding electrode pad 3 of the card 1.

In FIGS. 1A–D, a central portion of each contacting portion 7 is situated at an open surface of the release groove 14 formed at a central portion of the bottom surface of the contact guide groove 10 and extending in the direction of the reciprocal movement of the slider 5. Opposite lug portions of each contacting projection 7 itself serves as the portion slip 15. The lug portions 15 are resiliently contacted with a pair of the stepped portions 16, so that the central portion of the contacting projection 7 will not be in sliding relation with the bottom surface of the guide groove 10 during the reciprocal movement of the slider 5.

In the example of FIG. 2A–D, the contacting projection 7 is formed on a central portion of the free end portion of the elongated resilient piece 6 had by each contact 4. The pair of slip portions 15 are formed on opposite sides of each contacting projection 7 through the stepped portions and resiliently contacted with the pair of stepped portions 16.

In the example of FIGS. 3A–D, the slip portion 15 is formed on one or each of the opposite sides of each contacting projection 7 at the free end portion of the elongated resilient piece 6. The slip portion 15 is resiliently contacted with the stepped portion 16 and the contacting projection 7 is loosely fitted into the release groove 14 so that the contacting projection 7 is supported in such a manner as to float from the bottom surface of the groove 14.

As shown in FIG. 3D', a pair of projections are formed on opposite sides of each contacting projection 7 in symmetrical relation. The projections may serve as the slip portions 15 and resiliently contact with the stepped portions 16, so that the contacting projections 7 are released from the bottom surface of the guide groove 14.

In FIGS. 4A and 4B, there is a provision of the slider 5 which is reciprocally moved in accordance with insertion and withdrawal of the electrode pad attached card 1. The slider S is provided with the contact guide grooves 10 each having a bottom, extending in a direction of the reciprocal movement of the slider 5 and adapted to guide the contacting projections 7 of the contacts 4.

The contacting projection 7 of each contact 4 is provided at an area adjacent to a rear part thereof with a slip portion 17. The slip portion 17 is resiliently contacted with a bottom surface of the contact guide groove 10, such that the contacting projection 7 is floated from the bottom surface of the contact guide groove. The slider 5 is reciprocally moved with the slip portion 17 resiliently contacting the bottom surface of the contact guide groove 10. The resilient contact relation is canceled at the end of the forward movement of the slider 5 to allow the contacting projection 7 to be resiliently contacted with the electrode pad 3 of the card 1.

In the example of FIG. 5A–C, a sliding relationship between each contacting projection 7 and the bottom surface of its corresponding guide groove 10 can be avoided by using the release groove and the slip portion shown in FIGS. 1A through 3D or the slip portion shown in FIG. 4A and B.

There are two types of the contacting structure of each contact 4 with its corresponding electrode pad 3, namely, the first type being that the card 1, as a single body, is inserted into a given electronic instrument and the second being that the contacting structure is formed by way of a card-specific connector.

In the first-mentioned type, the contacts 4 and the slider 5 are arranged within a card receiving slit and the slider 5 is moved forwardly by insertion of the card 1 into the receiving slit. The contacting projections 7 are contacted under pressure with the electrode pads 3 at the end of the forward movement of the slider 5.

In the second-mentioned type, an exclusive card connector including the slider 5 and the contacts 4 is formed within a flat card receiving case having a card receiving slit. The card 1 is inserted into this case so that the slider is caused to move in accordance with the movement of the card 1. By doing so, the pressure contacting state can be realized. Then, this card connector is inserted into the card receiving slit of a given electronic instrument so that the card is electrically connected to the circuit within the electronic instrument. That is, the present invention can be practiced as a means for opening and closing a contacting relation between a card having an electrical circuit and a connector.

In any one of the above examples, a sliding relation between the contacting projection of each contact and the bottom surface of each contact guide groove is avoided during the reciprocal movement of the slider in accordance with insertion and withdrawal of the card, and a contact released state can correctly be established by the aforementioned resilient contacting relation.

Although specific embodiments of the invention have been described, it will be appreciated that the invention is susceptible to modification, variation and change without departing from its proper scope as exemplified by the following claims.

What is claimed is:

1. A shutter mechanism for an electrode pad attached card, comprising:
    a slider which can reciprocally move forwardly and backwardly between forward and rearward positions in accordance with insertion and withdrawal of an electrode pad attached card;
    a contact having a contacting projection;
    a contact guide groove formed in said slider so as to extend in a direction of the reciprocal movement of said slider and adapted to guide said contacting projection of said contact;
    a release groove formed in a bottom surface of said contact guide groove, said release groove having a smaller width than that of said guide groove and extending in the direction of the reciprocal movement of said slider, said release groove being in opposing relation with said contacting projection;
    a stepped portion formed along an opening edge of said release groove;
    a slip portion formed at an area in the vicinity of said contacting projection;
    wherein said slip portion is resiliently contacted with said stepped portion as said slider is reciprocally moved from said rearward position toward said forward position, and the resilient contact relation of said slip portion with said stepped portion is canceled when said slider reaches said forward position such that said contacting projection can resiliently contact with an electrode pad of the card.

2. A shutter mechanism according to claim 1, wherein said contacting projection is loosely fitted into said release groove while said slip portion is in resilient contact with said stepped portion.

3. A shutter mechanism according to claim 1, wherein said slip portion is disposed on each opposite side of said contacting projection.

4. A shutter mechanism for an electrode pad attached card, comprising:
    a slider which can reciprocally move forwardly and backwardly between forward and rearward positions in accordance with insertion and withdrawal of an electrode pad attached card;
    a contact having a contacting projection;
    a contact guide groove formed in said slider so as to extend in a direction of the reciprocal movement of said slider and adapted to guide said contacting projection of said contact; and
    a slip portion projecting from an area adjacent to a rear part of said contacting projection of said contact, said slip portion being resiliently contacted with a bottom surface of said contact guide groove, thereby creating a floating state of said contacting projection from said bottom surface of said contact guide groove;
    wherein said slip portion is resiliently contacted with said bottom surface of said contact guide groove as said slider is moved from said rearward position toward said forward position, and the resilient contact relation of said slip portion with said bottom surface of said contact guide groove is canceled when said slider reaches said forward position such that said contacting projection can resiliently contact with an electrode pad of the card.

* * * * *